United States Patent
Ding et al.

(10) Patent No.: US 12,001,178 B2
(45) Date of Patent: Jun. 4, 2024

(54) ALUMINUM OXIDE PRODUCTION OPERATION OPTIMIZATION SYSTEM AND METHOD BASED ON CLOUD-EDGE COLLABORATION

(71) Applicant: Northeastern University, Shenyang (CN)

(72) Inventors: Jinliang Ding, Shenyang (CN); Changxin Liu, Shenyang (CN); Depeng Xu, Shenyang (CN); Tianyou Chai, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 359 days.

(21) Appl. No.: 17/625,690

(22) PCT Filed: Jul. 19, 2019

(86) PCT No.: PCT/CN2019/096632
§ 371 (c)(1),
(2) Date: Jan. 7, 2022

(87) PCT Pub. No.: WO2021/007871
PCT Pub. Date: Jan. 21, 2021

(65) Prior Publication Data
US 2022/0326667 A1 Oct. 13, 2022

(30) Foreign Application Priority Data

Jul. 16, 2019 (CN) .......................... 201910640300.9

(51) Int. Cl.
*G05B 13/04* (2006.01)
*C01F 7/02* (2022.01)

(52) U.S. Cl.
CPC .............. *G05B 13/042* (2013.01); *C01F 7/02* (2013.01); *G05B 13/047* (2013.01)

(58) Field of Classification Search
CPC ....... G05B 13/042; G05B 13/047; C01F 7/02; Y02P 90/02; G06F 30/20
See application file for complete search history.

(56) References Cited

U.S. PATENT DOCUMENTS

2017/0339032 A1  11/2017  Yen

FOREIGN PATENT DOCUMENTS

| CN | 105021030 A | 11/2015 |
| CN | 105467946 A | 4/2016 |

OTHER PUBLICATIONS

Gui Wei-Hua et al., "A Review of Intelligent Optimal Manufacturing for Aluminum Reduction Production", Act Automatica Sinica, vol. 44, No. 11, Nov. 30, 2018. pp. 1957-1970.

*Primary Examiner* — Charles R Kasenge
(74) *Attorney, Agent, or Firm* — MUNCY, GEISSLER, OLDS & LOWE, P.C.

(57) ABSTRACT

Provided is an aluminum oxide production operation optimization system and method based on a cloud-edge collaboration, which relates to the technical field of an aluminum oxide production operation optimization. According to the system and method, firstly the whole-flow data in the aluminum oxide production process is acquired, the data is pre-processed, then the pre-processed data is transmitted to a local collaboration production operation optimization unit, the local collaboration production operation optimization unit firstly judges working conditions for the current aluminum oxide production process, an optimization strategy needing to be operated at present is automatically switched according to the working condition, and the local operation optimization strategy obtains the actual setting value of the aluminum oxide production operation indexes.

4 Claims, 2 Drawing Sheets

ALUMINUM OXIDE PRODUCTION OPERATION OPTIMIZATION SYSTEM AND METHOD BASED ON CLOUD-EDGE COLLABORATION

BACKGROUND OF THE INVENTION

1. Field of the Invention

The invention relates to the technical field of aluminum oxide production operation optimization, in particular to an aluminum oxide production operation optimization system and method based on a cloud-edge collaboration.

2. The Prior Arts

Aluminum and alloys thereof have many excellent properties. At the same time, aluminum is rich in resources, so that the aluminum industry has developed rapidly since inception. Large-scale equipment facilitates automatic detection and control of a technology process. A production control and management system based on microcomputers and computers provides a great potential for an aluminum oxide plant to improve labor productivity, reduce raw material consumption and save energy.

Although relevant companies have carried out project improvement and upgrade in an aluminum oxide smelting technology, there are still problems of poor raw material quality, high project energy consumption and insufficient product quality. Most of the products are intermediate aluminum oxide, which will affect application and management of a whole technology, and restrict product structure.

In a traditional aluminum oxide production process, many control indexes are mainly set by knowledge workers such as managers, dispatchers, engineers, etc. based on experience, and a production system cannot be operated under optimization conditions.

At the same time, in the whole process of aluminum oxide production, the connection between working procedures is very close. The products of the previous working procedure have a great impact on the production of the next working procedures. In the existing production system, it is difficult to integrate and extract the data in each working procedures to obtain the optimal production index setting of the whole flow.

SUMMARY OF THE INVENTION

For deficiency existing in the prior art, a technical problem to be solved by the invention is to provide an aluminum oxide production operation optimization system and method based on cloud-edge collaboration to achieve collaboration optimization of an aluminum oxide production operation process.

To solve the technical problem, the technical solution adopted by the invention lies in that: on one hand, the invention provides the aluminum oxide production operation optimization system based on a cloud-edge collaboration. The aluminum oxide production operation optimization system based on the cloud-edge collaboration comprises a process data acquisition unit, a cloud storage and collaboration optimization calculating unit, a local collaboration production operation optimization control unit and a data transmission unit.

The process data acquisition unit is used for acquiring the whole-flow actual data as aluminum oxide production process data of the aluminum oxide production process, and transmitting the acquired aluminum oxide production process data at fixed time intervals to the local collaboration production operation optimization control unit through the data transmission unit.

The local collaboration production operation optimization control unit operates at a local computer terminal, is used for controlling the aluminum oxide production collaboration optimization system, and comprises a data preprocessing and analyzing module, a production operation optimization strategy operating module, an optimization strategy long-distance correcting module, a local working condition identifying module, an optimization strategy switching module and a local model and strategy management module.

The optimization strategy long-distance correcting module is used for receiving the production operation optimization strategy recommended by the cloud, and storing the received production operation optimization strategy in the local model and strategy management module.

The data preprocessing and analyzing module performs timestamp unification and alignment and data preprocessing on the acquired aluminum oxide production process data, and transmits the preprocessed aluminum oxide production process data to the cloud storage and collaboration optimization calculating unit through the data transmission unit; different data preprocessing methods are adopted for the data preprocessing according to different types of the aluminum oxide production process data.

The local working condition identifying module performs the local analysis of the working conditions on the acquired aluminum oxide production process data, and provides the working conditions for the current aluminum oxide production process.

The optimization strategy switching module automatically switches the production operation optimization strategy needing to be operated at present based on the working conditions analyzed from the aluminum oxide production process data by the local working condition identifying module.

The production operation optimization strategy operating module operates the production operation optimization strategy provided by the optimization strategy switching module, and transmits the actual production operation setting value obtained through the operation to the bottom control device in the aluminum oxide production process through the data transmission unit.

The local module and strategy management module stores all aluminum oxide production process models in the aluminum oxide production operation optimization system and the production operation optimization strategy recommended by the cloud storage and collaboration optimization calculating unit.

The data transmission unit transmits data through a public network or a special line.

The cloud storage and collaboration optimization calculating unit operates at a cloud server, and comprises a production process historical data storing module, a big data based intelligent working condition sensing and analyzing module, a production process model building and testing module, a production operation optimization strategy configuring and testing module, a cloud model and strategy management module, a production operation optimization strategy big data analysis and intelligent recommending module, and a production process model and strategy issuing module.

The production process historical data storing module is used for receiving and storing the aluminum oxide production process data generated in the aluminum oxide production process, transmitted from the local collaboration production operation optimization control unit, for a long term, to provide sufficient data support for big data analysis, and storing the built aluminum oxide production process model and the production operation optimization strategy.

The big data based intelligent working condition sensing and analyzing module analyzes the acquired aluminum oxide production process data to obtain the working conditions for the current aluminum oxide production process.

The production process model building and testing module integrates the aluminum oxide production process data received from the local collaboration production operation optimization control unit, models a large amount of the aluminum oxide production process data generated in the aluminum oxide production process to obtain the aluminum oxide production process model, provides an accurate model for an optimization decision-making process, and adjusts the aluminum oxide production process model in real time according to precision of the aluminum oxide production process model and the working conditions for the current aluminum oxide production process.

The production operation optimization strategy configuring and testing module configures the production operation optimization strategy in the aluminum oxide production process through the existing aluminum oxide production process model and the production operation optimization strategy in the cloud model and strategy management module, and restores through cloud data when the local computer terminal breaks down.

The cloud model and strategy management module manages the aluminum oxide production process model generated by the production process model building and testing module and the production operation optimization strategy generated by the production operation optimization strategy configuring and testing module.

The production operation optimization strategy big data analysis and intelligent recommending module operates and optimizes multiple strategies of the same index in real time at the cloud, evaluates the strategies according to a historical actual index setting value of the bottom control device, and transmits the production operation optimization strategy with minimum evaluation result to the local collaboration production operation optimization control unit through the production process model and strategy issuing module.

On the other hand, the invention further provides an aluminum oxide production operation optimization method based on cloud-edge collaboration, comprising the following steps:

Step 1: acquiring the whole-flow actual data of the aluminum oxide production process as the aluminum oxide production process data through the process data acquisition unit, and transmitting the acquired aluminum oxide production process data at the fixed time intervals to the local collaboration production operation optimization control unit through the data transmission unit;

Step 2: selecting aluminum oxide production operation indexes and variables to be optimized, determining whether the aluminum oxide production process model corresponding to the selected aluminum oxide production operation indexes and variables exists in model and strategy management modules of the local collaboration production operation optimization control unit or not, if yes, directly going to step 5, or else, performing step 3;

Step 3: adding the aluminum oxide production operation indexes and variables needing to be modelled through the model and strategy management modules of the local collaboration production operation optimization control unit, acquiring time periods of the aluminum oxide production operation indexed and variables, and selecting a sample partitioning method, a data pre-processing manner and a modelling method, corresponding to the aluminum oxide production operation indexes and variables to be modelled;

Step 4: inputting modelling information into the cloud storage and collaboration optimization calculating unit, performing data modelling and testing at the cloud through the production process model building and testing module, meanwhile, adjusting the aluminum oxide production process model in real time according to the precision of the aluminum oxide production process model and the working conditions for the current aluminum oxide production process, and transmitting the built model back to the aluminum oxide production process model and strategy management modules of the local collaboration production operation optimization control unit;

Step 5: configuring the production operation optimization strategy to be optimized at the production operation optimization strategy configuring and testing module of the cloud storage and collaboration optimization calculating unit by a user, and testing the configured the production operation optimization strategy, wherein the strategy configuration comprises configuration of target indexes, boundary conditions, decision-making variables, production process models and optimization algorithms;

Step 6: operating multiple production operation optimization strategies in real time at the cloud, evaluating the strategy result, selecting the production operation optimization strategy having a minimum deviation from the historical actual setting value, and transmitting the selected production operation optimization strategy back to the local optimization strategy long-distance correcting module;

Step 7: identifying the working conditions by the local working condition identifying module according to the aluminum oxide production process data, transferring the working condition analysis result to the production operation optimization strategy switching module, and adjusting the optimization strategies by the optimization strategy switching module according to the working condition analysis result;

Step 8: enabling the production operation optimization strategy operating module of the local collaboration production operation optimization control unit to perform real-time operation calculation on the optimization strategies provided by the optimization strategy switching module, and providing the calculation result; and Step 9: transmitting the actual setting value to the bottom control device in the aluminum oxide production process by the data transmission unit according to the calculation result provided by the production operation optimization strategy operating module.

Beneficial effects generated by adopting the above technical solution lie in: according to the aluminum oxide production operation optimization system and method based on cloud-edge collaboration provided by the invention, for a large amount of data generated in the aluminum oxide production process, data analysis and processing are performed by methods of machine learning and the like at the cloud, an accurate aluminum oxide production process model is obtained, and a basis is provided for accurate aluminum oxide production operation index optimization decision-making. Data integration and real-time data calculation are performed locally, data transmission cost and time delay are reduced, real-time optimization calculation is provided, and besides, normal operation of the system under the situation of network outage is guaranteed. Real-time index optimization in the aluminum oxide production process can be realized, production energy consumption is reduced, production efficiency is improved, production waste is reduced, production dispatching reasonability is increased, and a scheme for coordinating the whole production process is provided.

DETAILED DESCRIPTION OF THE PREFERRED EMBODIMENT

The specific implementations of the invention are described in more detail below with reference to the accompanying drawings and embodiments. The following embodiments are intended to illustrate the invention, rather than to limit the scope of the invention.

Figure 1:
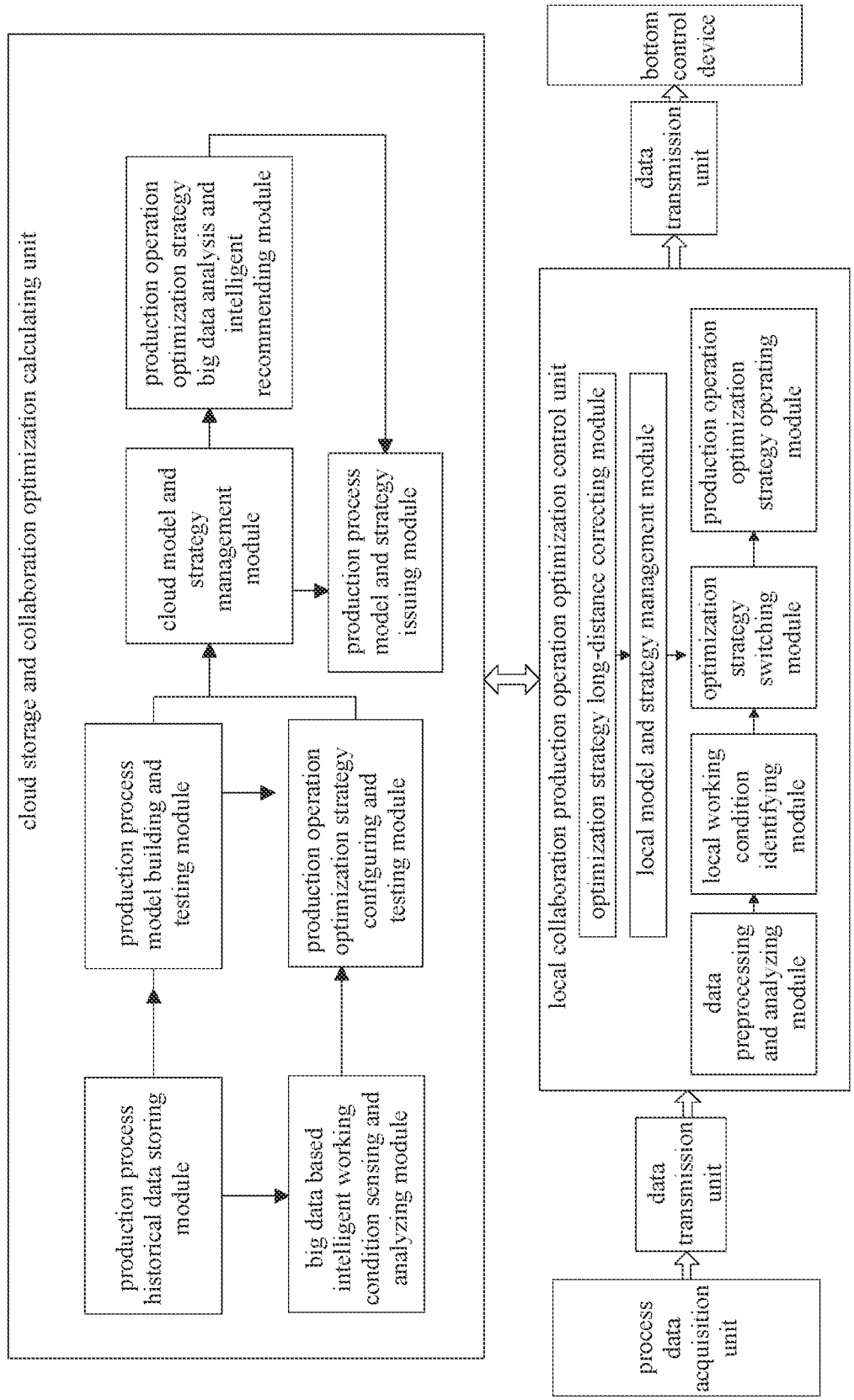
FIG. 1 is a structural block diagram of an aluminum oxide production operation optimization system based on cloud-edge collaboration according to an embodiment of the invention.

In the embodiments, as shown in FIG. 1, an aluminum oxide production operation optimization system based on cloud-edge collaboration comprises a process data acquisition unit, a cloud storage and collaboration optimization calculating unit, a local collaboration production operation optimization unit and a data transmission unit.

The process data acquisition unit is used for acquiring the whole-flow actual data of the aluminum oxide production process, and transmitting the acquired data at fixed time intervals to the local collaboration production operation optimization unit through the data transmission unit.

The local collaboration production operation optimization control unit operates at a local computer terminal, is used for controlling an aluminum oxide production collaboration optimization system, and comprises a data preprocessing and analyzing module, a production operation optimization strategy operating module, an optimization strategy long-distance correcting module, a local working condition identifying module, an optimization strategy switching module and a local model and strategy management module.

The optimization strategy long-distance correcting module is used for receiving the optimization strategy recommended by the cloud, and storing the received strategy in the local model and strategy management module.

The data preprocessing and analyzing module performs timestamp unification and alignment and data preprocessing on the acquired aluminum oxide production process data, and transmits the preprocessed data to the cloud storage and collaboration optimization calculating unit through the data transmission unit; different data preprocessing methods are adopted according to different types of aluminum oxide production process data.

The local working condition identifying module performs local analysis of working conditions on the acquired aluminum oxide production process real-time data, and provides the working conditions where the production having the current aluminum oxide production process is located.

The optimization strategy switching module automatically switches the optimization strategy needing to be operated at present based on the working condition information analyzed from the real-time data according to the local working condition identifying module.

The production operation optimization strategy operating module operates the strategy provided by the optimization strategy switching module, and sends down the actual production operation setting value obtained through operation to the bottom control device in the aluminum oxide production process through the data transmission unit.

The local model and strategy management module stores all aluminum oxide production process models in the aluminum oxide production operation optimization system and the optimization strategy recommended by the cloud storage and collaboration optimization calculating unit.

The data transmission unit transmits data through a public network or a special line.

The cloud storage and collaboration optimization calculating unit operates at a cloud server, and comprises a production process historical data storing module, a big data based intelligent working condition sensing and analyzing module, a production process model building and testing module, a production operation optimization strategy configuring and testing module, a cloud model and strategy management module, a production operation optimization strategy big data analysis and intelligent recommending module, and a production process model and strategy issuing module.

The production process historical data storing module is used for receiving and storing data generated in the production process, transmitted from the local collaboration production operation optimization control unit, for a long term, to provide sufficient data support for big data analysis, and besides, storing the built aluminum oxide production process model and the production operation optimization strategy.

The big data based intelligent working condition sensing and analyzing module analyzes the acquired aluminum oxide production process data to obtain the working conditions where aluminum oxide production is located.

The production process model building and testing module integrates the data received from the local collaboration production operation optimization control unit, models a large amount of data generated in the production process to obtain the aluminum oxide production process model, provides an accurate model for an optimization decision-making process, and besides, adjusts the model in real time according to the precision of the model and the working conditions where the current production is located.

The production operation optimization strategy configuring and testing module configures a production operation optimization strategy in the aluminum oxide production technology process through the existing aluminum oxide production process model and the production operation optimization strategy in the cloud model and strategy management module, and restores through the cloud data when the local computer terminal breaks down.

The cloud model and strategy management module manages the model generated by the production process model building and testing module and the strategy generated by the production operation optimization strategy configuring and testing module.

The production operation optimization strategy big data analysis and intelligent recommending module operates and optimizes multiple strategies of the same index in real time at the cloud, evaluates the strategies according to the historical actual index setting value of the historical bottom control device, and sends down the strategy with the minimum evaluation result deviation to the local collaboration production operation optimization control unit through the production process model and strategy issuing module.

Figure 2:
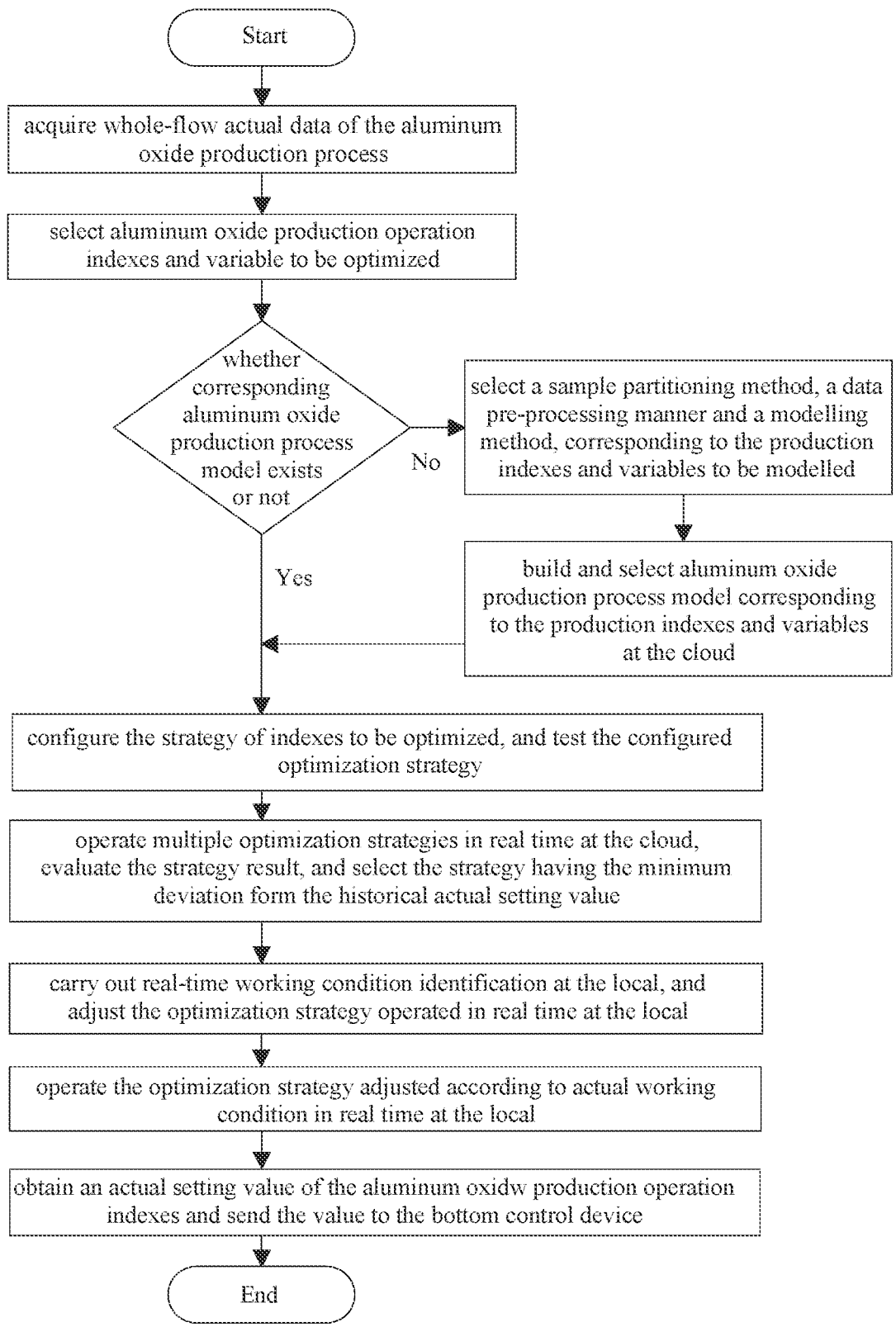
FIG. 2 is a flowchart of aluminum oxide production operation optimization based on cloud-edge collaboration according to an embodiment of the invention.

As shown in FIG. 2, an aluminum oxide production operation optimization method based on cloud-edge collaboration, comprises the following steps:

Step 1: acquiring the whole-flow actual data of the aluminum oxide production process through the process data acquisition unit, and transmitting the acquired data at fixed time intervals to the local collaboration production operation optimization unit through the data transmission unit;

Step 2: selecting aluminum oxide production operation indexes and variables to be optimized, judging whether an aluminum oxide production process model corresponding to the selected aluminum oxide production operation indexes and variables exists in model and strategy management modules of the local collaboration production operation optimization unit or not, if yes, directly going to step 5, or else, performing step 3;

Step 3: adding production indexes and variables needing to be modelled through the model and strategy management modules of the local collaboration production operation optimization control unit, acquiring time periods of the production index and variable data, and selecting a sample partitioning method, a data pre-processing manner and a modelling method, corresponding to the production indexes and variables to be modelled;

Step 4: inputting modelling information into the cloud storage and collaboration optimization calculating unit, performing data modelling and testing at the cloud through the production process model building and testing module, at the same time, adjusting the model in real time according to the precision of the model and the working condition where the current production is located, and transmitting the built model back to the model and strategy management modules of the local collaboration production operation optimization control unit;

Step 5: configuring the strategy of indexes to be optimized at the production operation optimization strategy configuring and testing module of the cloud storage and collaboration optimization calculating unit by a user, and testing the configured optimization strategy, wherein the strategy configuration comprises configuration of target indexes, boundary conditions, decision-making variables, production process models and optimization algorithms;

Step 6: operating multiple optimization strategies in real time at the cloud, evaluating the strategy result, selecting the strategy having a minimum deviation from the historical actual setting value, and transmitting the selected strategy back to the local optimization strategy long-distance correcting module;

Step 7: identifying working conditions by the local working condition identifying module according to real-time data, transferring the working condition analysis result to the optimization strategy switching module, and adjusting the optimization strategies by the optimization strategy switching module according to the working condition analysis result;

Step 8: enabling the production operation optimization strategy operating module of the local collaboration production operation optimization control unit to perform real-time operation calculation on the optimization strategies provided by the optimization strategy switching module, and providing the calculation result; and Step 9: transmitting the actual setting value to the bottom control device in the aluminum oxide production process by the data transmission unit according to the calculation result provided by the production operation optimization strategy operating module.

In the embodiments, milling A/S, mine adjustment NK, mine adjustment solid content, dissolution ak, dissolution solid content in a certain period of time in a laboratory assay result are selected as decision-making variables through the model and strategy management module of the local collaboration production operation optimization control unit, dissolution rate is used as an index for modelling, and parts of selected data are shown in Table 1:

TABLE 1

Variable and index data in aluminum oxide production process

| Serial number | Milling A/S/times | Adjustment NK/g/l | Mine adjustment solid content/g/l | Dissolution ak | Dissolution solid content/g/l | Dissolution rate/% |
|---|---|---|---|---|---|---|
| 1 | 4.395187 | 211.6667 | 286.1667 | 1.391063 | 202.1667 | 96.86 |
| 2 | 4.672563 | 214 | 376 | 1.401941 | 204 | 97.53 |
| 3 | 4.741389 | 209 | 309 | 1.39895 | 204 | 96.56 |
| 4 | 5.550644 | 215 | 278 | 1.409388 | 177 | 97.2 |
| 5 | 4.852236 | 210 | 314.25 | 1.377606 | 173 | 96.91 |
| 6 | 4.87716 | 212.6667 | 288 | 1.388105 | 192.1667 | 98.08 |
| 7 | 4.76835 | 210.4 | 293.8 | 1.376074 | 195.6667 | 97.08 |
| 8 | 5.707254 | 210.3333 | 274.5 | 1.376349 | 181.8333 | 97.1 |
| 9 | 5.323379 | 214.3333 | 275.1667 | 1.397671 | 191.75 | 97.87 |
| 10 | 5.06608 | 209.3333 | 284.8333 | 1.390329 | 190.6667 | 96.83 |
| 11 | 4.537283 | 208.3333 | 317.1667 | 1.393564 | 188.3333 | 98.52 |
| 12 | 4.91 | 209.8333 | 326.5 | 1.384174 | 202.25 | 97.86 |
| 13 | 5.18329 | 208.5 | 325 | 1.381464 | 214.6667 | 97.83 |
| 14 | 5.260857 | 207.3333 | 316.5 | 1.384526 | 221.8 | 96.57 |
| 15 | 4.27 | 211.6667 | 277.5 | 1.393839 | 214.8333 | 96.11 |
| 16 | 4.21 | 210.1667 | 278.3333 | 1.391229 | 195.5 | 98.1 |
| 17 | 5.23 | 212.3333 | 294.8333 | 1.394135 | 180.3333 | 97.32 |
| 18 | 5.050581 | 209 | 274.6667 | 1.381533 | 208 | 96.53 |
| 19 | 5.159917 | 215.3333 | 287 | 1.3833 | 199 | 95.6 |
| 20 | 4.60739 | 211 | 284.5 | 1.378287 | 206.3333 | 95.17 |

In implementation of the embodiment, modelling is carried out by selecting a hold-out method as a sample partitioning method, a normalization pre-processing manner as a data pre-processing manner, and a support vector machine for a modelling method.

In the embodiment, a genetic algorithm is selected for optimizing indexes in the aluminum oxide production operation process, and boundary conditions for decision-making variables are provided. The boundary conditions for the decision-making variables in the embodiment are shown in Table 2:

TABLE 2

Boundary conditions of variables

| Serial number | Variable name | Boundary condition |
|---|---|---|
| 1 | Milling A/S | >4.2 |
| 2 | mine adjustment NK | 200-220 |
| 3 | mine adjustment solid content | 300-400 |
| 4 | Dissolution ak | 1.4-1.45 |
| 5 | Dissolution solid content | 180-200 |

In the embodiment, an optimization strategy is provided for only one working condition, so that the invention does not relate to intelligent recommendation of a cloud optimization strategy and a local working condition identifying process.

In the embodiment, the strategy provided by the optimization strategy switching module is operated and calculated in real time through the production operation optimization strategy operation module of the local collaboration production operation optimization control unit, and the calculation result is provided.

In the embodiment, decision-making variables obtained through calculation are as follows:
[4.5373, 208.3333, 317.1667, 1.4135, 188.333]
The dissolution rate is 98.85%.

An aluminum oxide production engineer provides the actual setting values of the variables and indexes according to the calculation results obtained through calculation and their own experience, and sends the actual setting values to the bottom control device in the aluminum oxide production process through the data transmission unit.

Finally, it should be noted that the embodiments are merely intended to describe the technical schemes of the invention, rather than to limit the invention. Although the invention is described in detail with reference to the above embodiments, persons of ordinary skilled in the art should understand that they may still make modifications to the technical schemes described in the above embodiments or make equivalent replacements to some or all technical features thereof. However, these modifications or replacements do not cause the essence of the corresponding technical schemes to depart from the scope of the technical schemes of the embodiments of the invention.

What is claimed is:

1. An aluminum oxide production operation optimization system based on a cloud-edge collaboration, comprising a process data acquisition unit, a cloud storage and collaboration optimization calculating unit, a local collaboration production operation optimization control unit and a data transmission unit,
wherein the process data acquisition unit is used for acquiring whole-flow actual data as aluminum oxide production process data in an aluminum oxide production process, and transmitting the acquired aluminum oxide production process data at fixed time intervals to the local collaboration production operation optimization control unit and the cloud storage and collaboration optimization calculating unit through the data transmission unit;
the local collaboration production operation optimization control unit operates at a local computer terminal, is used for controlling the aluminum oxide production collaboration optimization system, preprocessing the acquired aluminum oxide production process data, uploading the preprocessed aluminum oxide production process data to the cloud storage and collaboration optimization calculating unit through the data transmission unit, performing local analysis of working conditions on the acquired aluminum oxide production process data, providing working conditions for a current aluminum oxide production process, and automatically switching an production operation optimization strategy needing to be operated at present according to the working conditions; the production operation optimization strategy is operated at the local computer terminal, and an actual production operation setting value obtained through operation is transmitted to a bottom control device in the aluminum oxide production process through the data transmission unit; and the cloud storage and collaboration optimization calculating unit operates at a cloud, and is used for receiving and storing the aluminum oxide production process data generated in the aluminum oxide production process, transmitted by the local collaboration production operation optimization control unit, and storing a built aluminum oxide production process model and the production operation optimization strategy; and the aluminum oxide production process data received from the local collaboration production operation optimization control unit is integrated, the aluminum oxide production process data generated in the aluminum oxide production process is modelled, the aluminum oxide production process model is obtained, the production operation optimization strategy in the aluminum oxide production process is configured through an existing aluminum oxide production process model and the production operation optimization strategy, and the built aluminum oxide production process model and the configured production operation optimization strategy are transmitted to the local collaboration production operation optimization control unit through the data transmission unit.

2. The aluminum oxide production operation optimization system according to claim 1, wherein the local collaboration production operation optimization control unit comprises a data preprocessing and analyzing module, a production operation optimization strategy operating module, an optimization strategy long-distance correcting module, a local working condition identifying module, an optimization strategy switching module and a local model and strategy management module;
wherein the optimization strategy long-distance correcting module is used for receiving the production operation optimization strategy recommended by the cloud, and storing the received production operation optimization strategy in the local model and strategy management module;
the data preprocessing and analyzing module performs timestamp unification and alignment and data preprocessing on the acquired aluminum oxide production process data, and transmits the preprocessed aluminum oxide production process data to the cloud storage and collaboration optimization calculating unit through the data transmission unit; different data preprocessing methods are adopted for the data preprocessing according to different types of the aluminum oxide production process data;

the local working condition identifying module performs the local analysis of the working conditions on the acquired aluminum oxide production process data, and provides the working conditions for the current aluminum oxide production process;

the optimization strategy switching module automatically switches the production operation optimization strategy needing to be operated at present based on the working conditions analyzed from the aluminum oxide production process data by the local working condition identifying module;

the production operation optimization strategy operating module operates the production operation optimization strategy provided by the optimization strategy switching module, and transmits the actual production operation setting value obtained through the operation to the bottom control device in the aluminum oxide production process through the data transmission unit;

the local model and strategy management module stores all aluminum oxide production process models in the aluminum oxide production operation optimization system and the production operation optimization strategy recommended by the cloud storage and collaboration optimization calculating unit; and the data transmission unit transmits data through a public network or a special line.

3. The aluminum oxide production operation optimization system according to claim 2, wherein the cloud storage and collaboration optimization calculating unit comprises a production process historical data storing module, a big data based intelligent working condition sensing and analyzing module, a production process model building and testing module, a production operation optimization strategy configuring and testing module, a cloud model and strategy management module, a production operation optimization strategy big data analysis and intelligent recommending module, and a production process model and strategy issuing module;

wherein the production process historical data storing module is used for receiving and storing the aluminum oxide production process data generated in the aluminum oxide production process, transmitted from the local collaboration production operation optimization control unit, for a long term, to provide sufficient data support for big data analysis, and storing the built aluminum oxide production process model and the production operation optimization strategy;

the big data based intelligent working condition sensing and analyzing module analyzes the acquired aluminum oxide production process data to obtain the working conditions for the current aluminum oxide production process;

the production process model building and testing module integrates the aluminum oxide production process data received from the local collaboration production operation optimization control unit, models the aluminum oxide production process data generated in the aluminum oxide production process to obtain the aluminum oxide production process model, provides an accurate model for an optimization decision-making process, and adjusts the aluminum oxide production process model in real time according to precision of the aluminum oxide production process model and the working conditions for the current aluminum oxide production process;

the production operation optimization strategy configuring and testing module configures the production operation optimization strategy in the aluminum oxide production process through the existing aluminum oxide production process model and the production operation optimization strategy in the cloud model and strategy management module, and restores through cloud data when the local computer terminal breaks down;

the cloud model and strategy management module manages the aluminum oxide production process model generated by the production process model building and testing module and the production operation optimization strategy generated by the production operation optimization strategy configuring and testing module; and the production operation optimization strategy big data analysis and intelligent recommending module operates and optimizes multiple strategies of the same index in real time at the cloud, evaluates the strategies according to a historical actual index setting value of the bottom control device, and transmit the production operation optimization strategy with a minimum evaluation result deviation to the local collaboration production operation optimization control unit through the production process model and strategy issuing module.

4. An aluminum oxide production operation optimization method based on a cloud-edge collaboration, adopting the aluminum oxide production operation optimization system according to claim 3 for optimization, comprising the following steps:

step 1: acquiring the whole-flow actual data of the aluminum oxide production process as the aluminum oxide production process data through the process data acquisition unit, and transmitting the acquired aluminum oxide production process data at the fixed time intervals to the local collaboration production operation optimization control unit through the data transmission unit;

step 2: selecting aluminum oxide production operation indexes and variables to be optimized, determining whether the aluminum oxide production process model corresponding to the selected aluminum oxide production operation indexes and variables exists in model and strategy management modules of the local collaboration production operation optimization control unit or not, if yes, directly going to step 5, or else, performing step 3;

step 3: adding the aluminum oxide production operation indexes and variables needing to be modelled through the model and strategy management modules of the local collaboration production operation optimization control unit, acquiring time periods of the aluminum oxide production operation indexes and variables, and selecting a sample partitioning method, a data preprocessing manner and a modelling method, corresponding to the aluminum oxide production operation indexes and variables to be modelled;

step 4: inputting modelling information into the cloud storage and collaboration optimization calculating unit, performing data modelling and testing at the cloud through the production process model building and testing module, meanwhile, adjusting the aluminum oxide production process model in real time according to the precision of the aluminum oxide production process model and the working conditions for the current aluminum oxide production process, and transmitting the built aluminum oxide production process model back to the model and strategy management modules of the local collaboration production operation optimization control unit;

step 5: configuring the production operation optimization strategy to be optimized at the production operation optimization strategy configuring and testing module of the cloud storage and collaboration optimization calculating unit by a user, and testing the configured production operation optimization strategy, wherein the strategy configuration comprises configuration of target indexes, boundary conditions, decision-making variables, production process models and optimization algorithms;

step 6: operating multiple production operation optimization strategies in real time at the cloud, evaluating the strategy result, selecting the production operation optimization strategy having a minimum deviation from the historical actual setting value, and transmitting the selected production operation optimization strategy back to the local optimization strategy long-distance correcting module;

step 7: identifying the working conditions by the local working condition identifying module according to the aluminum oxide production process data, transferring the working condition analysis result to the optimization strategy switching module, and adjusting the production operation optimization strategies by the optimization strategy switching module according to the working condition analysis result;

step 8: enabling the production operation optimization strategy operating module of the local collaboration production operation optimization control unit to perform real-time operation calculation on the optimization strategies provided by the optimization strategy switching module, and providing the calculation result; and step 9: transmitting the actual setting value to the bottom control device in the aluminum oxide production process by the data transmission unit according to the calculation result provided by the production operation optimization strategy operating module.

* * * * *